S. Moore.
Leak Stopper.
Nº 92,338. Patented Jan. 6, 1869.
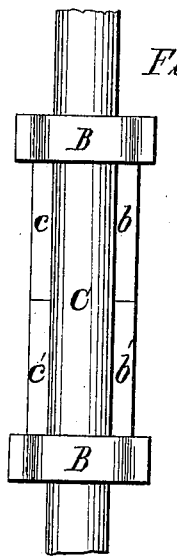
Fig. 1
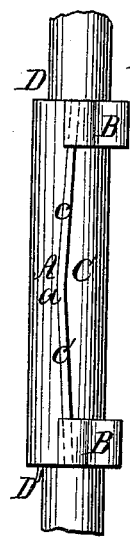
Fig. 2
Fig. 4
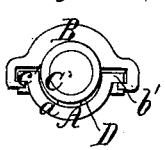
Fig. 3
Witnesses
Inventor
Stephen Moore
by his attorney

United States Patent Office.

STEPHEN MOORE, OF SUDBURY, MASSACHUSETTS, ASSIGNOR TO HIMSELF AND HOMER ROGERS, OF SAME PLACE.

Letters Patent No. 92,338, dated July 6, 1869.

PIPE-LEAK STOPPER.

The Schedule referred to in these Letters Patent and making part of the same.

*To all persons to whom these presents may come:*

Be it known that I, STEPHEN MOORE, of Sudbury, of the county of Middlesex, and State of Massachusetts, have invented a new and useful Pipe-Leak Stopper; and do hereby declare the same to be fully described in the following specification, and represented in the accompanying drawings, of which—

Figure 1 is a top view,
Figure 2, a side elevation,
Figure 3, a transverse section, and
Figure 4, an end view of it, as applied to a pipe.

The purpose of the invention is to stop, in a gas, water, or steam-pipe, a leak.

In the drawings—

A denotes what I term the saddle;
B B, the clamps; and
C, the pipe, to which they are applied.

D is a strip of India rubber, or other proper material, laid on the crack or opening o, in the pipe, and interposed between it and the saddle.

The said saddle is composed not only of the segment a of a tube, but of two angular or crowned flanges, b b', c c', disposed on the flanks thereof.

Each of such flanges is composed of two inclined planes, arranged at an oblique angle to each other, and in other respects, relatively to the segment, in manner as represented.

The two clamps are formed so as to extend across and against the pipe, and to embrace or hook upon the opposite flanges of the saddle, the whole being as shown in the drawings.

By driving the clamps toward one another on the inclined planes, such clamps will draw the saddle closely down upon the packing of India rubber, so as to close the crack or opening o in the pipe.

I claim the leak-stopper, substantially as described, that is, as composed of the tubular segment, the two flanges or pairs of inclined planes, and the clamps, arranged in manner and so as to operate together, as and for the purpose as specified.

STEPHEN MOORE.

Witnesses:
R. H. EDDY,
SAMUEL N. PIPER.